US008520928B2

United States Patent
Bilgin et al.

(10) Patent No.: US 8,520,928 B2
(45) Date of Patent: Aug. 27, 2013

(54) SYSTEM AND METHOD FOR MOTION-COMPENSATED COMPRESSED SENSING FOR DYNAMIC IMAGING

(75) Inventors: Ali Bilgin, Tucson, AZ (US); Yookyung Kim, Tucson, AZ (US); Mariappan S. Nadar, Plainsboro, NJ (US); Rajagopalan Sundaresan, Tucson, AZ (US)

(73) Assignees: Arizona Board of Regents on behalf of the University of Arizona, Tucson, AZ (US); Siemens Corporation, Iselin, NJ (US)

( * ) Notice: Subject to any disclaimer, the term of this patent is extended or adjusted under 35 U.S.C. 154(b) by 360 days.

(21) Appl. No.: 13/104,255

(22) Filed: May 10, 2011

(65) Prior Publication Data

US 2012/0008844 A1    Jan. 12, 2012

Related U.S. Application Data (60) Provisional application No. 61/399,516, filed on Jul. 12, 2010.

(51) Int. Cl.
*G06K 9/00* (2006.01)
(52) U.S. Cl.
USPC ........................................... 382/131; 382/128
(58) Field of Classification Search
USPC .............................................. 382/128–131
See application file for complete search history.

(56) References Cited

U.S. PATENT DOCUMENTS

| 7,852,977 | B2 * | 12/2010 | Wegener et al. | 378/4 |
|---|---|---|---|---|
| 8,111,893 | B2 * | 2/2012 | Chen et al. | 382/131 |
| 8,194,937 | B2 * | 6/2012 | Chen | 382/118 |
| 8,310,233 | B2 * | 11/2012 | Trzasko et al. | 324/309 |
| 8,315,353 | B1 * | 11/2012 | Hsieh et al. | 378/8 |
| 8,326,054 | B2 * | 12/2012 | Chen et al. | 382/232 |
| 2012/0008844 | A1 * | 1/2012 | Bilgin et al. | 382/131 |
| 2012/0027280 | A1 * | 2/2012 | Ramirez Giraldo et al. | 382/131 |
| 2012/0148128 | A1 * | 6/2012 | Chefd'hotel et al. | 382/131 |
| 2012/0148129 | A1 * | 6/2012 | Chang et al. | 382/131 |
| 2012/0321162 | A1 * | 12/2012 | Liu et al. | 382/131 |
| 2013/0121550 | A1 * | 5/2013 | Chang et al. | 382/130 |

* cited by examiner

*Primary Examiner* — Jayesh A Patel
*Assistant Examiner* — Iman K Kholdebarin
(74) *Attorney, Agent, or Firm* — Donald B. Paschburg; F. Chau & Associates, LLC (57) ABSTRACT

A method for reconstructing a digital image from a set of measurements includes providing a previous image frame in a time series of measurements of an image signal and a current image frame in the time series, calculating an estimated motion vector for a spatial point and current time point between the previous and current image frames, calculating a motion compensated current image frame from the previous image frame, estimating a known support set of a sparse signal estimate of the motion compensated current image frame where the support set comprises indices of non-zero elements of the sparse signal estimate, calculating a sparse signal corresponding to the current image frame whose support contains a smallest number of new additions to the known support set while satisfying a data consistency constraint, and correcting the motion compensated current image frame image frame from the sparse signal.

22 Claims, 6 Drawing Sheets

FIGURE 1

PRIOR ART

SYSTEM AND METHOD FOR MOTION-COMPENSATED COMPRESSED SENSING FOR DYNAMIC IMAGING

CROSS REFERENCE TO RELATED UNITED STATES APPLICATIONS

This application claims priority from "Motion-Compensated Compressed Sensing for Dynamic Imaging", U.S. Provisional Application No. 61/399,516 of Kim, et al., filed Jul. 12, 2010, the contents of which are herein incorporated by reference in their entirety.

TECHNICAL FIELD

This disclosure is directed to methods for reconstructing time-varying signals from limited number of measurements. More specifically, this disclosure is directed to using motion estimation and compensation techniques to reconstruct more accurate estimates of support for image sequences with substantial motion, such as cardiac magnetic resonance imaging (MRI) sequences.

DISCUSSION OF THE RELATED ART

Compressive Sensing or Compressive Sampling (CS) is a recently introduced framework for reconstructing sparse or compressible signals accurately from far fewer samples than suggested by the Nyquist-Shannon sampling theorem. CS theory states that signals with sparse representations can be recovered from a small number of incoherent linear measurements. The CS theory has attracted significant attention for applications such as Magnetic Resonance Imaging (MRI) where long acquisition times have been problematic. This is especially true for applications such as dynamic MRI where high spatio-temporal resolution is needed. For example, in cardiac cine MRI, it is desirable to acquire the whole cardiac volume within a single breath-hold in order to avoid artifacts due to respiratory motion. Conventional MRI techniques do not allow reconstruction of high resolution image sequences from such limited amount of data. However, since MR images often have sparse representations, CS is an ideal candidate for accelerating data acquisition in MRI.

There has been recent interest in incorporating prior information into the CS framework to handle situations with partially known support, referred to as a sparsity pattern. One extension assumes that the support of the signal in the sparse domain is partially known. For example, such prior information can be available when recursively reconstructing a time sequence of sparse signals. Under the assumption that the support of the signal changes slowly over time, the support of the signal at the previous time-point can be used as the known part of the support for the current time-point. If the known part of the support is denoted using the set T, the basic idea is to find a signal with the sparsest support outside of T while satisfying the data consistency constraint. While this "modified CS" (MCS) approach works well for image sequences with little or no motion, motion causes significant change in support between adjacent frames. When the support estimate is not accurate, the performance of MCS deteriorates.

SUMMARY OF THE INVENTION

Exemplary embodiments of the invention as described herein generally include methods and systems for applying motion estimation to a sequence of images reconstructed using MCS. Motion estimation and compensation techniques that have been successfully used in video coding applications can be used to improve support estimation, and thus, the overall performance. Using this motion information, motion compensated frames are created. Support estimates are then obtained from these motion compensated frames instead of the initially reconstructed frames and the MCS framework is used with this updated support information to produce the final reconstructed image sequence. Experimental results using phantoms as well as real MRI data sets illustrate the improved performance of a method according to an embodiment of the invention.

According to a first aspect of the invention, there is provided a method for reconstructing a digital image from a set of measurements, the method including providing a previous image frame corresponding to a previous time point in a time series of measurements of an image signal, and a current image frame corresponding to a current time point in the time series, calculating an estimated motion vector $d_t = [d_1(n_1, n_2, t), d_2(n_1, n_2, t)]^T$ for spatial point $(n_1, n_2)$ and current time point t between the previous image frame and the current image frame, calculating a motion compensated current image frame $f_t(n_1, n_2)$ from the previous image frame $f_{t-1}(n_1, n_2)$ as $f_t(n_1, n_2) = f_{t-1}(n_1 + d_1(n_1, n_2, t), n_2 + d_2(n_1, n_2, t))$, estimating a known support set of a sparse signal estimate of the motion compensated current image frame, where the support set of the sparse signal estimate comprises indices of non-zero elements of the sparse signal estimate, calculating a sparse signal corresponding to the current image frame whose support contains a smallest number of new additions to the known support set while satisfying a data consistency constraint, and correcting the motion compensated current image frame image frame from the sparse signal.

According to a further aspect of the invention, the time series of measurements of the image signal comprises a measurement vector $y_t$ and a measurement matrix $A_t$ for each time point t, the sparse signal $x_t$ is calculated for each time point t of the time series of measurements from the measurement vector $y_t$ and the measurement matrix $A_t$, and the image frame $f_t$ is calculated from the sparse signal $x_t$ for each time point in the time series.

According to a further aspect of the invention, calculating the sparse signal $x_t$ from the measurement vector y and the measurement matrix $A_t$ includes finding an $x_t$ that minimizes an $l_1$ norm $|x_t|$ subject to a data consistency constraint $y_t = A_t x_t$.

According to a further aspect of the invention, calculating the sparse signal $x_t$ from the measurement vector y and the measurement matrix $A_t$ for each time point t includes finding $x_t$ that minimizes $|x_t|$ subject to $y_t = A_t x_t$ for t=0, where $x_t$ is an N-dimensional vector, $y_t$ is an M-dimensional vector, and M<<N, initializing a support set of $x_t$ at t=0 as $\hat{S}_0 = \{i \in [1,N]: (\hat{x}_0)_i^2 > \alpha\}$, where $\alpha$ is a predetermined threshold, where the support set of $x_t$ comprises indices of non-zero elements of $x_t$, finding an $\hat{x}_t$ that minimizes $|x_t|$ over the complement of the support set subject to $y_t = A_t x_t$, updating the support set $\hat{S}_t$ of $x_t$ from $\hat{S}_t = \{i \in [1,N]: (\hat{x}_t)_i^2 > \alpha\}$, and repeating the steps of finding an $\hat{x}_t$ that minimizes $|x_t|$ and updating the support set $\hat{S}_t$ of $x_t$ for all t>0.

According to a further aspect of the invention, the image frame for a given time point is related to the sparse signal for that time point by a linear transformation.

According to a further aspect of the invention, estimating the known support set $\hat{S}_t$ of the sparse signal of the motion compensated current image frame comprises calculating $\hat{S}_t = \{i \in [1,N]: (\hat{x}_t^{MC})_i^2 > \alpha\}$, where t is the current time point, $\alpha$ is a predetermined threshold, $\hat{x}_t^{MC}$ is an N-dimensional vector that is the sparse signal of the motion compensated current image frame, and the support set of $\hat{x}_t^{MC}$ comprises indices of non-zero elements of $\hat{x}_t^{MC}$.

According to a further aspect of the invention, calculating a sparse signal corresponding to the current image frame comprises finding $\hat{x}_t$ that minimizes $|x_t|$ over the complement of the support set $\hat{S}_t$ while satisfying the data consistency constraint.

According to a further aspect of the invention, the data consistency constraint is $y_t=A_t x_t$.

According to a further aspect of the invention, finding the sparse signal corresponding to the current time point comprises finding $\hat{x}_t$ that minimizes $|Wx_t|$ over a complement of a support set $V=\{i\in[1,N]:(x^P)_i^2>\alpha\}$ subject to $y_t=A_t x_t$, where $x^P$ is a N-dimensional vector of predictions of the sparse signal estimate of the motion compensated image frame, and W is a weight matrix that is a function of the prediction vector $x^P$.

According to another aspect of the invention, there is provided a non-transitory program storage device readable by a computer, tangibly embodying a program of instructions executable by the computer to perform the method steps for reconstructing a digital image from a set of measurements.

DETAILED DESCRIPTION OF EXEMPLARY EMBODIMENTS

Exemplary embodiments of the invention as described herein generally include systems and methods for using motion estimation and compensation techniques to reconstruct more accurate estimates of support for image sequences with substantial motion. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Compressed Sensing Theory

Let x denote an N-dimensional vector that represents the desired signal in the sparse domain. This signal can be linearly measured using an M×N measurement matrix A, $$y=Ax, \qquad (1)$$

to obtain the M-dimensional measurement vector y, where M<<N. Given the measurement vector y and the measurement matrix A, the CS theory suggests that the sparse vector x can be recovered by solving the constrained $l_1$ minimization:

$$\arg_x \min \|x\|_1, \text{ such that } y=Ax, \qquad (2)$$

provided that certain conditions on sparsity and restricted isometry are satisfied. In EQ. (2), minimizing the $l_1$ norm promotes sparsity while the data constraint y=Ax is used to ensure consistency with measurements. If x is K-sparse, that is, only K out of N coefficients are non-zero, practical results suggest that x can be recovered from 3K to 5K random measurements. The CS theory has been extended to cover signals that are not strictly sparse, but are compressible.

Before describing MCS, notation should be established. Let $A^C$ denote the complement of a set A, $A\setminus B=A\cap B^C$ denote set difference, and $|A|$ denote the cardinality of the set A. Let $(\beta)_A$ denote a sub-vector that contains the elements with indices in A.

MCS makes use of partial information about the support of the sparse vector x that is available from prior knowledge. Let S denote the support set of x, i.e. the set S contains the indices of the non-zero elements of x. This support can be expressed as $S=T\cup\Delta\setminus\Delta_e$, where T denotes the known part of the support of x, $\Delta=S\setminus T$ denotes the unknown part of the support, and $\Delta_e=T\setminus S$ denotes the error in the known part of the support. The goal of MCS is to find a signal β whose support contains the smallest number of new additions to the known support T while satisfying the data consistency constraint:

$$\arg_\beta \min \|(\beta)_{T^C}\|_1, \text{ such that } y=A\beta. \qquad (3)$$

Similar to the CS, minimizing the $l_1$ norm of $(\beta)_{T^C}$ promotes sparsity, i.e. the smallest number of new additions to the known support T, while the data constraint y=Aβ ensures consistency with measurements.

An MCS method can be used to reconstruct a time sequence of images. Let $x_t$ denote the sparse representation of the image frame at time instance t and $y_t$ denote the measurement vector at time instance t. Similarly, let $S_t$ and $A_t$ denote the support set of $x_t$ and the measurement matrix at time instance t, respectively. An algorithm for dynamic MCS can then be stated as follows, with reference to the flow chart of FIG. 1.

Figure 1:
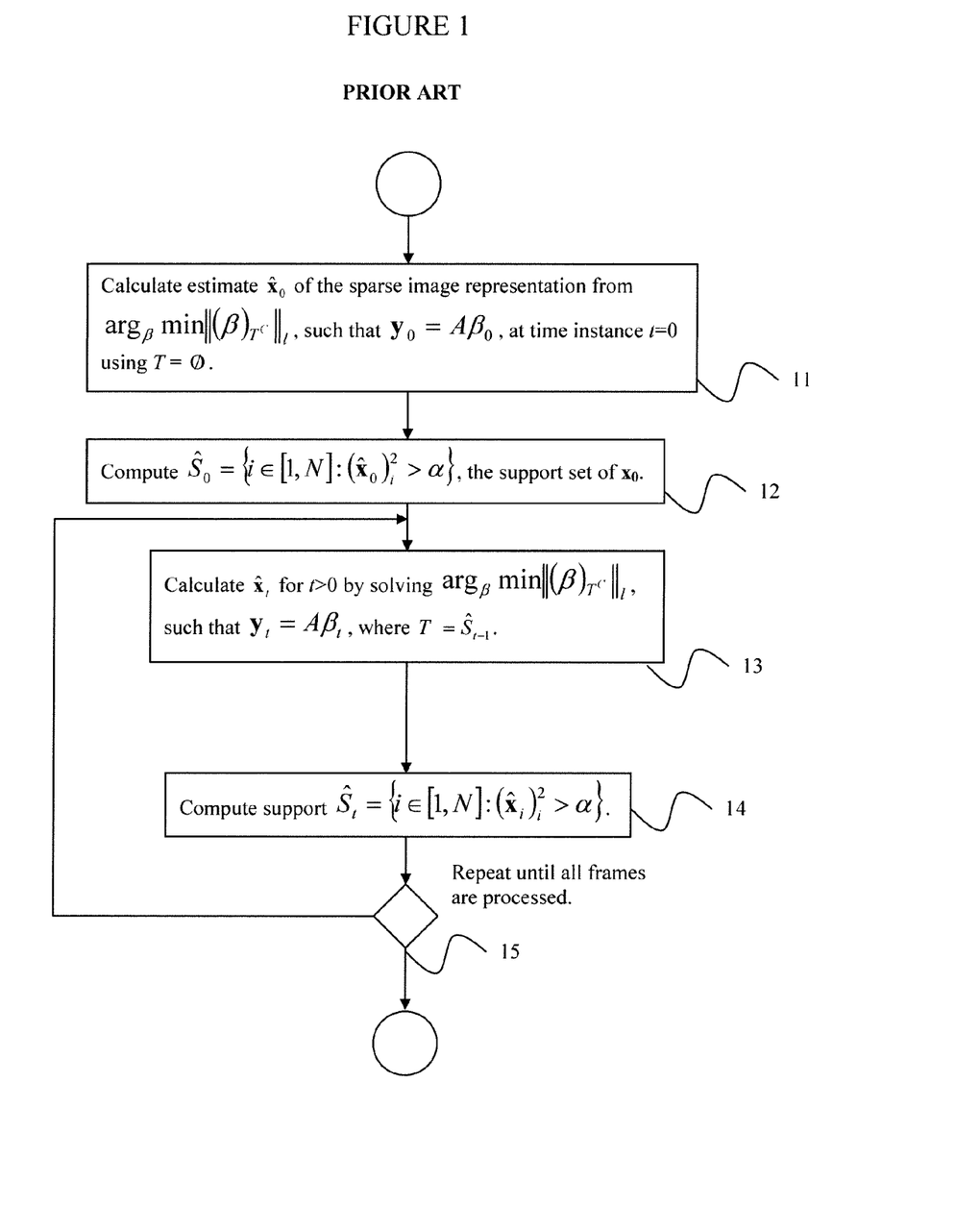
FIG. 1 is a flowchart of an algorithm for dynamic MCS.

A dynamic method begins at step 11, for time t=0, by solving the MCS minimization $\arg_\beta \min\|(\beta)_{T^c}\|_l$, such that $y_0 = A\beta_0$, to calculate an estimate of the sparse representation of the image frame at time instance t=0 using $T=\emptyset$. Let $\hat{x}_0$ denote this estimate. At step 12, estimate $\hat{S}_0$ of the support set of $x_0$ is computed from $\hat{S}_0 = \{i \in [1,N] : (\hat{x}_0)_i^2 > \alpha\}$, where $\alpha$ is a predetermined threshold. Then, for t>0, at step 13, calculate $\hat{x}_t$ by solving $\arg_\beta \min\|(\beta)_{T^c}\|_l$, such that $y_t = A\beta_t$, where $T = \hat{S}_{t-1}$. The support is estimated at step 14 from $\hat{S}_t = \{i \in [1,N] : (\hat{x}_t)_i^2 > \alpha\}$. At step 15, increment t and go to Step 13 unless all frames have been processed.

Motion Compensated Modified CS

As described above, a dynamic MCS framework relies on the assumption that the support of the signal changes slowly over time, and, thus, the estimate of the support set of $x_t$ obtained using the previous time point is accurate. In other words, dynamic MCS works well when $|S_t \backslash \hat{S}_{t-1}|$ is small. However, in many image sequences, the objects being imaged move during data acquisition and such motion can cause significant differences in support sets of adjacent time points. If the motion between image frames can be estimated, the support estimate can be updated to compensate for such motion. According to an embodiment of the invention, motion compensation methods can be incorporated into the MCS framework.

While a framework according to an embodiment of the invention can easily accommodate more sophisticated motion models, a simple motion model can be used in this work, by only considering image-plane motion and assume that it can be well approximated by 2-dimensional (2-D) correspondence fields. Let $f(n_1, n_2, t)$ denote the spatio-temporal sample at time t and spatial location $(n_1, n_2)$. If one assumes that there exists real-valued correspondence vectors $d_t = [d_1(n_1, n_2, t), d_2(n_1, n_2, t)]^T$ such that $$f(n_1, n_2, t+1) = f(n_1 + d_1(n_1, n_2, t), n_2 + d_2(n_1, n_2, t), t). \quad (4)$$

According to an embodiment of the invention, the correspondence vector can be determined by a non-rigid registration of the two images. Such registration can be computationally complex, and according to other embodiments of the invention, it is sufficient to determine the correspondence vector using simple block matching, under the assumption of translational motion. Using $f_t$ to denote the image frame at time t in vector notation, let $d_t = \text{ME}(f_t, f_{t+1})$ and $f_{t+1} = \text{MC}(f_t, d_t)$ denote the motion estimation and motion compensation operators, respectively. Furthermore, let $\Psi$ denote the orthonormal sparsity transform such that $x_t = \Psi f_t$ and $f_t = \Psi^{-1} x_t$. Note that the images f themselves need not be sparse. Thus, f represents the (possibly non-sparse) image frame and $x = \Psi f$ is the sparse representation of that image frame. For example, an MRI image (i.e. f) is not generally sparse. However, if one takes its wavelet transform, the resulting vector of wavelet coefficients (i.e. x) is (approximately) sparse.

Figure 2:
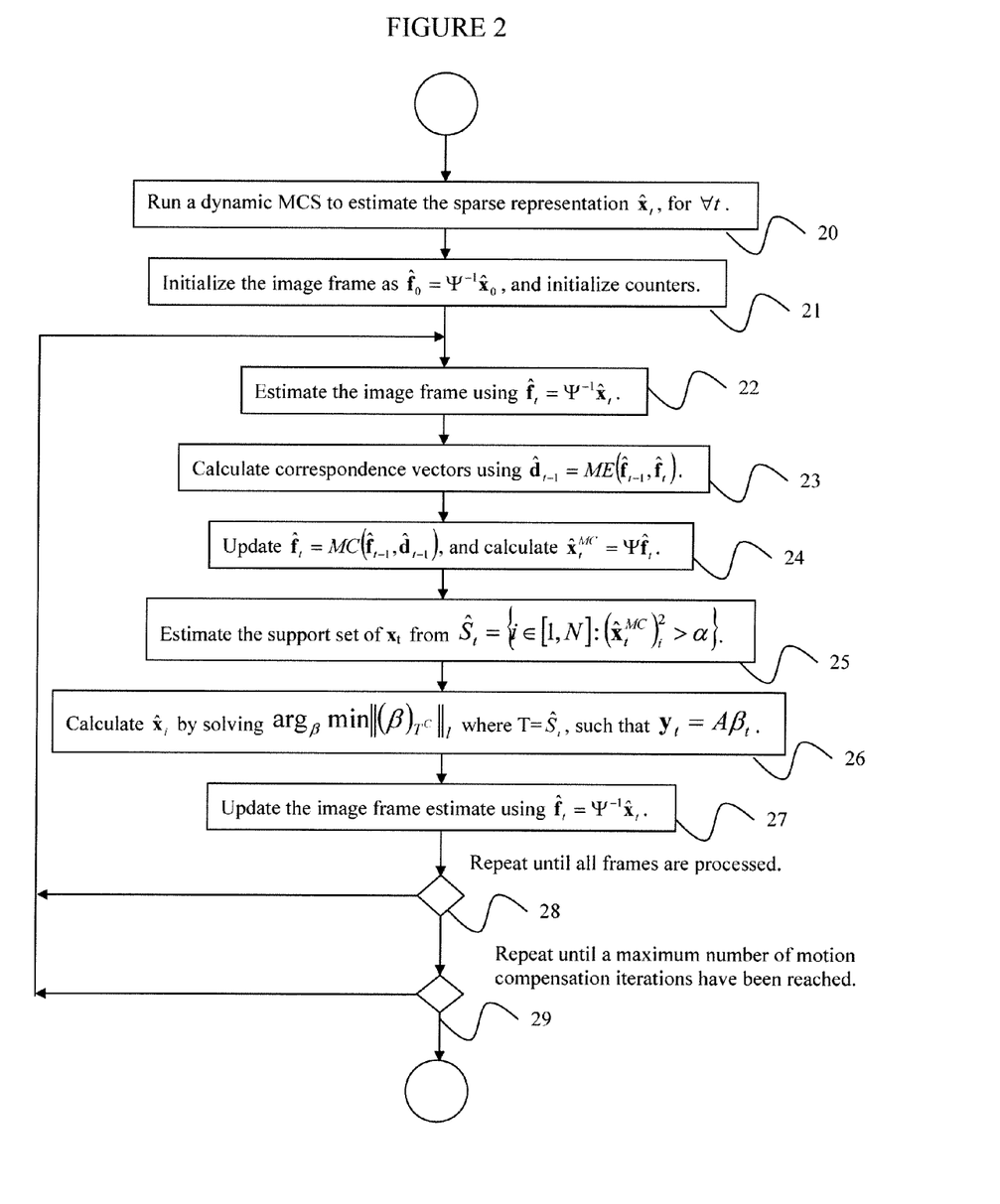
FIG. 2 is a flowchart of an algorithm for a motion-compensated modified compressed sensing (MC-MCS) according to an embodiment of the invention.

An algorithm according to an embodiment of the invention for MC-MCS can then be stated as follows, with reference to the flow chart of FIG. 2. Referring now to the figure, an MC-MCS algorithm according to an embodiment of the invention begins at step 20 by running a dynamic MCS algorithm to calculate estimates of the sparse representation $\hat{x}_t$, for $\forall t$. At step 21, the image frame is initialized as $\hat{f}_0 = \Psi^{-1}\hat{x}_0$, a motion compensation iteration index $j_{MC}$ is set to zero, and a time counter t is set to 1. While $j_{MC}$ is less than the desired number of motion compensation iterations, the following steps are repeated. An estimate of the image frame is calculated using $\hat{f}_t = \Psi^{-1}\hat{x}_t$ at step 22. The correspondence vectors are calculated using $\hat{d}_{t-1} = \text{ME}(\hat{f}_{t-1}, \hat{f}_t)$ at step 23. At step 24, $\hat{f}_t = \text{MC}(\hat{f}_{t-1}, \hat{d}_{t-1})$ is updated and $\hat{x}_t^{MC} = \Psi \hat{f}_t$ is calculated. The support set of $x_t$ is estimated as $\hat{S}_t = \{i \in [1,N] : (\hat{x}_t^{MC})_i^2 > \alpha\}$, at step 25. At step 26, $\hat{x}_t$ is calculated by solving $\arg_\beta \min\|(\beta)_{T^c}\|_l$, where T is set as $T = \hat{S}_t$, such that $y_t = A\beta_t$. The estimate of the image frame is updated at step 27 using $\hat{f}_t = \Psi^{-1}\hat{x}_t$. Then, at step 28, the time counter t is incremented and the method returns to step 203, unless all frames have been processed. If all frames have been processed, then t is reset to 1, $j_{MC}$ is incremented, and the process returns to step 22 from step 29 until a maximum number of motion compensation iterations has been reached.

The minimization in EQ. (3) can be rewritten as $$\arg_\beta \min\|W_{T^c}\beta\|_l, \text{ such that } y = A\beta, \quad (5)$$

where $W_{T^c}$ denotes a diagonal weighting matrix. The diagonal elements of this weighting matrix are defined as $$W_{T^c} = \begin{cases} 1 & i \in T^c, \\ 0 & \text{otherwise.} \end{cases} \quad (6)$$

In other words, the diagonal weights corresponding to the elements within the estimated support are set to zero and outside the estimated support (i.e. in $T_C$) are set to one.

A framework according to an embodiment of the invention can be further extended to not only include the sparse support information, but also information about the magnitudes of the sparse coefficients. Let $x^P$ denote a prediction of the sparse vector x. The information about both the support and the magnitudes of the sparse coefficients contained in this prediction can be incorporated into the above framework through the use of the weights. The weighted $l_1$ minimization can be written as $$\arg_\beta \min\|W\beta\|_1 \text{ such that } y = A\beta. \quad (7)$$

The weights in the above equation can be selected in one of several ways.

(1) Set the diagonal weights as $$w(i, i) = \frac{1}{|(x^P)_i|}.$$

(2) Estimate the support set of $x^P$ using $V = \{i \in [1,N] : (x^P)_i^2 > \alpha\}$. Then the weights can be determined using $$w(i, i) = \begin{cases} 1 & i \in V^C, \\ 0 & \text{otherwise.} \end{cases}$$

(3) Given V, the support set of $x^P$, the weights can be determined using $$w(i, i) = \begin{cases} \frac{1}{|(x^P)_i|} & i \in V^C, \\ 0 & \text{otherwise.} \end{cases}$$

(4) Given V, the support set of $x^P$, the weights can be determined using $$w(i, i) = \begin{cases} 1 & i \in V^C, \\ \frac{1}{|(x^P)_i|} & \text{otherwise.} \end{cases}$$

It should be noted that a framework according to an embodiment of the invention can incorporate other prediction models, depending on the application. For example, predictive models for multi-view images, predictive models based on image registration, or other predictive models (single/double exponential signal decay models for T2, diffusion models, etc.) can be incorporated into a framework according to an embodiment of the invention.

While the weight formulae written above assume a noise free measurement environment, they can be easily modified to incorporate noisy measurements using by changing the data consistency constraint to $\|y-A\beta\|_2 \leq \epsilon$, where the value of $\epsilon$ is adjusted depending on the amount of noise in the measurements.

Experimental Results

Figure 3:
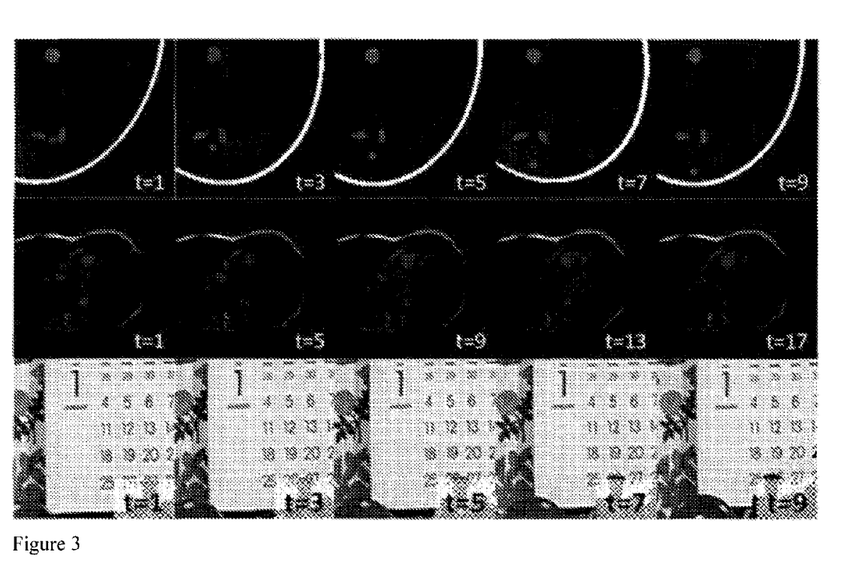
FIG. 3 depicts sample frames from image sequences used in experiments, according to an embodiment of the invention.

Experiments were conducted to evaluate the performance of an MCMCS technique according to an embodiment of the invention. Three image sequences were used in the experiments. A phantom sequence was created by incorporating motion into a cropped Shepp-Logan phantom. The dimensions of each image frame were 128×128 pixels and there were 10 image frames the sequence. A heart sequence was a cardiac cine MR image sequence with 256×256 pixels and 20 frames, i.e., phases within a cardiac cycle. A mobile sequence was a video sequence. This sequence was cropped to 128×128 pixels and 10 frames were used in the experiments. Sample frames from each sequence are displayed in FIG. 3. The sequences are, from top to bottom, phantom, heart, and mobile. For the phantom and mobile sequences, 2-level Haar discrete wavelet transform (DWT) was used as the sparsity transform. For the heart sequence, 4-level Daubechies wavelet with 4 vanishing moments was used as the sparsity basis. The particular sparsity transforms were selected because they provided accurate approximations of the corresponding image sequence from a small number of sparse-domain coefficients. The piecewise constant nature of the phantom image was a good fit for the Haar wavelet, whereas the smoother heart image was well approximated using the Daubechies wavelet with 4 vanishing moments.

A framework according to an embodiment of the invention is also general enough to accommodate different motion estimation techniques. Two different motion estimation techniques were used to estimate motion: a simple translational block-based motion estimation with block size of 8×8 and exhaustive search using the Mean Absolute Difference (MAD) metric was used for the heart and mobile sequences. For the phantom sequence, whose complex motion cannot be well approximated by translational block motion, a more general motion estimation model was used that allowed for translation and an affine coordinate transformation for the phantom sequence.

Evaluation of Support Mismatch

Figure 4:
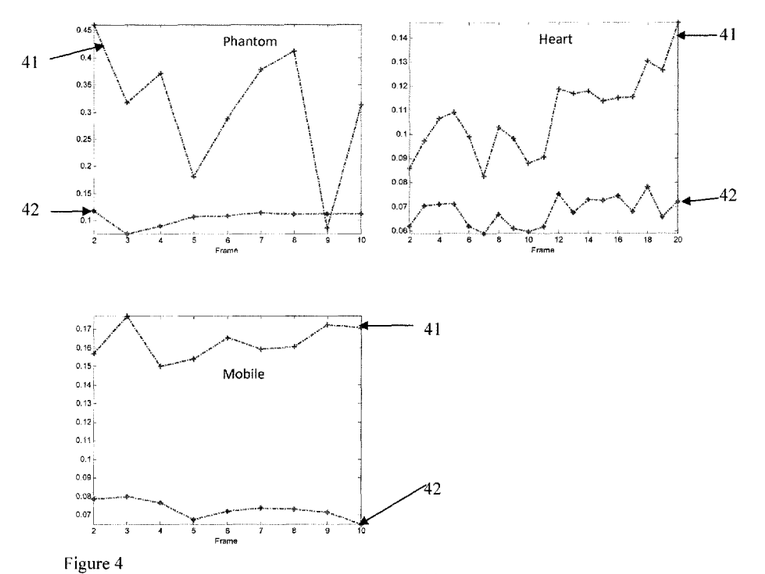
FIG. 4 are graphs that compare the different support mismatch measures for the phantom, heart, and mobile image sequences, according to an embodiment of the invention.

The first results are from a set of experiments designed to investigate the accuracy of support estimation with and without motion compensation. Let b %-energy support denote the set $U_t=\{i \in [1,N]:(x_t)_i^2 > \zeta_t\}$ where $\zeta_t$ is the largest real number for which at least b % of the signal energy at time t is contained in $U_t$. The value of b can be selected to contain most of the signal energy, e.g. b=99. The b %-energy support is useful in evaluating supports of signals that are not in a strict sense sparse, but are compressible. Since MCS relies on the assumption that the support of the signal changes slowly over time, the change in b % energy support between consecutive time frames can be considered as a measure of expected MCS performance. In other words, if $|U_t \setminus U_{t-1}|/|U_t|$ is small, MCS can be expected to perform well. Similarly, the mismatch in b % support between an image frame and its motion compensated estimate can be used as a measure of expected MC-MCS performance. This mismatch can be defined as $|U_t \setminus U_t^{MC}|/|U_t|$, where $U_t^{MC}=\{i \in [1,N]:(\hat{x}_t^{MC})_i^2 > \zeta_t\}$. The quantities $|U_t \setminus U_{t-1}|/|U_t|$ vs. $|U_t \setminus U_t^{MC}|/|U_t|$ were evaluated for the three image sequences described earlier and the results are presented in FIG. 4, where the plots 41 depict the $|U_t \setminus U_{t-1}|/|U_t|$ points, and the plots 42 depict the $|U_t \setminus U_t^{MC}|/|U_t|$ points. In these experiments, b=99. As expected, the results in FIG. 4 illustrate that mismatch in support between an image frame and its motion compensated estimate can be significantly lower than the mismatch in support between two adjacent frames, when motion is present in the sequence.

Reconstruction Experiments

Figure 5:
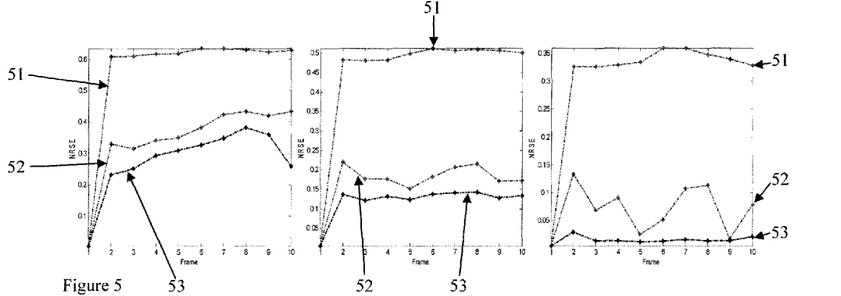
FIG. 5 are graphs that compare different CS techniques on the phantom sequence, according to an embodiment of the invention.
Figure 6:
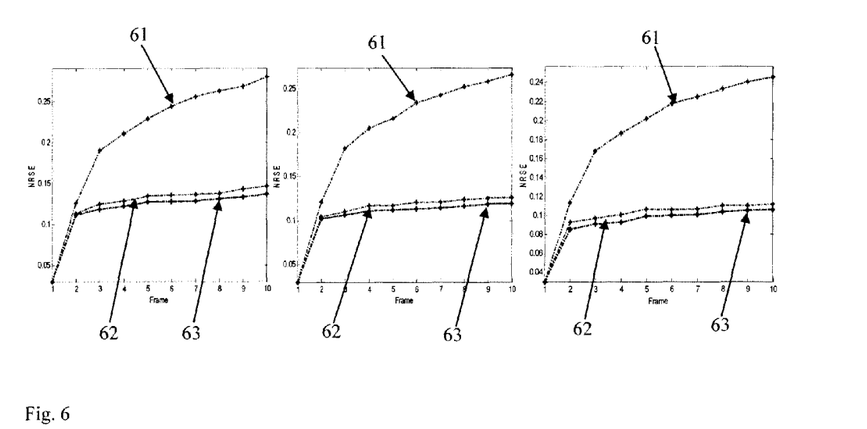
FIG. 6 are graphs that compare different CS techniques on the mobile sequence, according to an embodiment of the invention.
Figure 7:
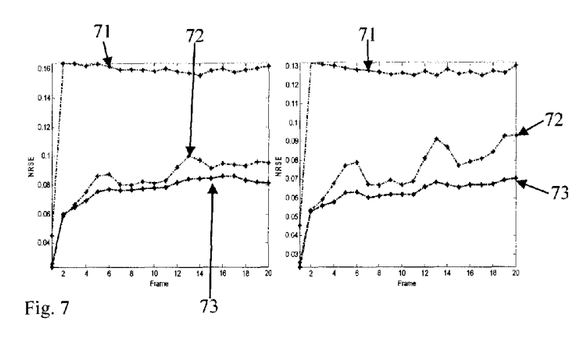
FIG. 7 are graphs that compare different CS techniques on the heart sequence, according to an embodiment of the invention.
Figure 8:
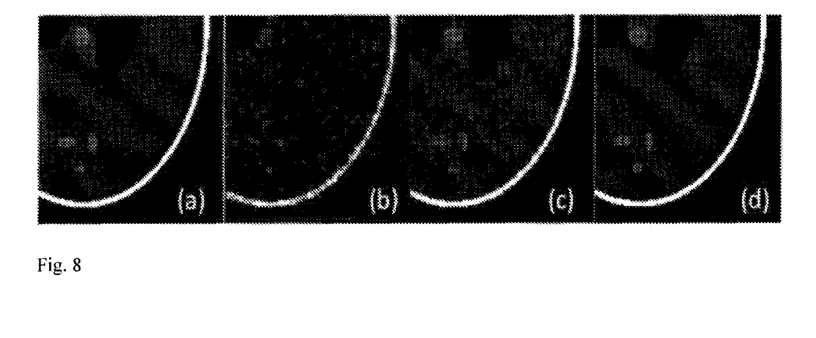
FIGS. 8(a)-(d) depict an original frame of the phantom sequence and three reconstructed frames, according to an embodiment of the invention.

Experiments were performed to compare a MC-MCS method according to an embodiment of the invention to MCS and conventional CS algorithms. For the first set of experiments, random Gaussian measurements were used. At t=0, M=0.5N (i.e. 50% measurements) and the set T was empty. For the remaining frames (t>0), different undersampling ratios ranging from M=0.15N to M=0.25N were tested. The NESTA toolbox, available at http://acm.caltech.edu/nesta/, was used to solve the conventional CS minimization and an MCS and an MC-MCS algorithm according to an embodiment of the invention were implemented using the NESTA toolbox. Normalized Root Squared Error (NRSE), defined as $e_t = \sqrt{\|f_t - \hat{f}_t\|_2^2 / \|f_t\|_2^2}$ was used to compare the performances of different algorithms. For each undersampling ratio, experiments were repeated using 5 random realizations of the measurement matrix, and the NRSE values obtained from these realizations were averaged. FIG. 5 illustrates comparisons of the NRSE performances of the three CS techniques for, from left to right, measurement sizes of M=0.15N, M=0.20N, and M=0.25N on the phantom sequence. In the figures, plots 51 are the conventional CS results, plots 52 are the modified-CS results, and plots 53 are the results for an MC-MCS according to an embodiment of the invention. The results indicate that an MC-MCS method according to an embodiment of the invention produced lower NRSE values for all frames and all undersampling ratios compared to MCS in these experiments. Both MCS and an MC-MCS method according to an embodiment of the invention performed significantly better than the conventional CS as well. Similarly, FIG. 6 illustrates comparisons of the NRSE performances of the three CS techniques on the mobile sequence. In this case, from left to right, measurement sizes of M=0.30N, M=0.35N, and M=0.40N were used. In the figures, plots 61 are the conventional CS results, plots 62 are the modified-CS results, and plots 63 are the results for an MC-MCS according to an embodiment of the invention. For the second set of experiments, random Fourier measurements were used on the heart sequence. For t>0, undersampling ratios ranging from M=0.16N and M=0.19N were tested and plots comparing the NRSE performances of the three CS techniques are presented in FIG. 7, with M=0.16N on the left and M=0.19N on the right. In the figures, plots 71 are the conventional CS results, plots 72 are the modified-CS results, and plots 73 are the results for an MC-MCS according to an embodiment of the invention. To illustrate the visual quality of the reconstructed frames, the reconstructed images at t=5 of the phantom sequence obtained using different CS methods for M=0.15N are shown in FIGS. 8(a)-(d), together with the corresponding original frame. The original frame is depicted in FIG. 8(a), while FIGS. 8(b), (c), and (d) respectively show frames reconstructed using a conventional CS, an MCS, and a MC-MCS according to an embodiment of the invention. While the visual quality of the images obtained from both conventional CS and MCS are poor in the figure, the image obtained using an MC-MCS method according to an embodiment of the invention exhibits significantly improved quality.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
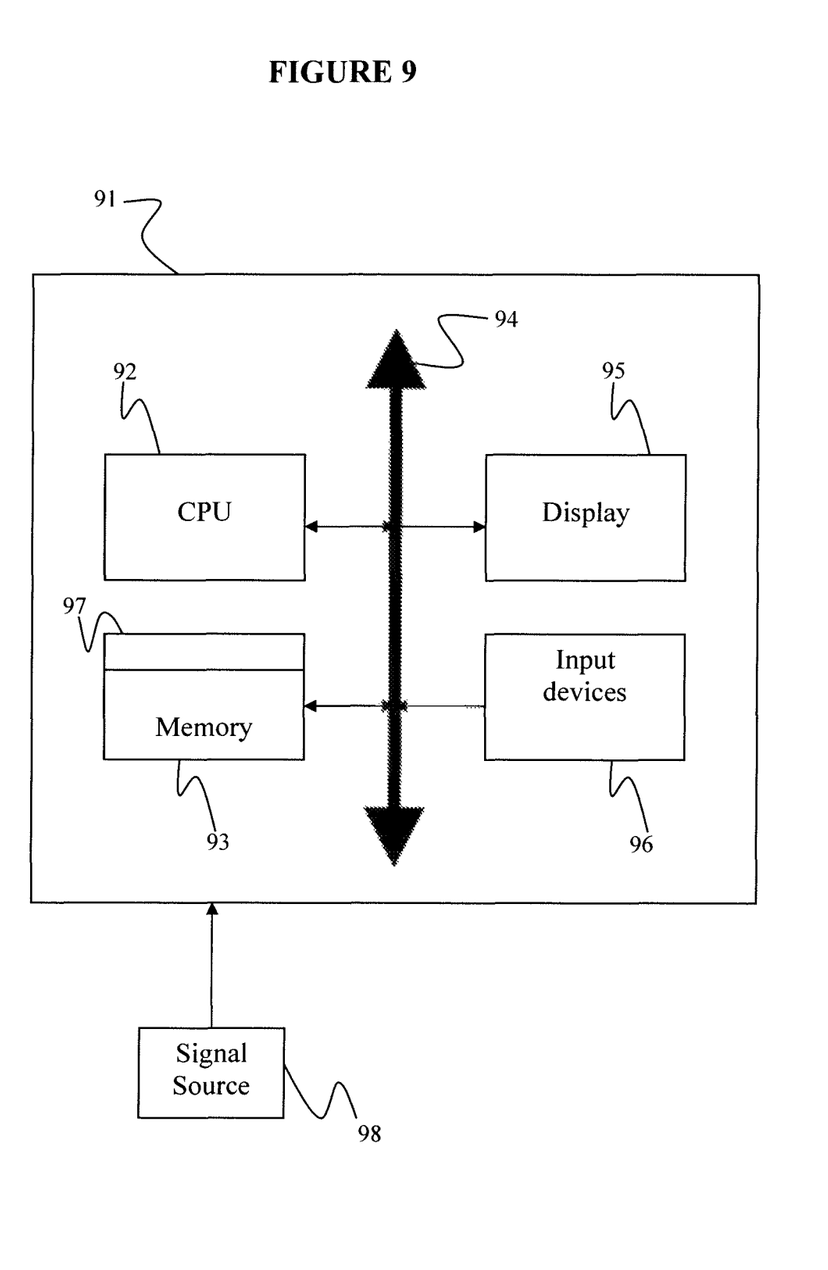
FIG. 9 is a block diagram of an exemplary computer system for implementing a method for using motion estimation and compensation techniques to reconstruct more accurate estimates of support for image sequences with substantial motion, according to an embodiment of the invention.

FIG. 9 is a block diagram of an exemplary computer system for implementing a method for using motion estimation and compensation techniques to reconstruct more accurate estimates of support for image sequences with substantial motion, according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer implemented method of reconstructing a digital image from a set of measurements, the method performed by the computer comprising the steps of:
   providing a previous image frame corresponding to a previous time point in a time series of measurements of an image signal, and a current image frame corresponding to a current time point in said time series;
   calculating an estimated motion vector $d_{t-1}$ for spatial point $(n_1, n_2)$ and current time point t between the previous image frame corresponding to the previous time point and the current image frame corresponding to the current time point;
   updating a motion compensated current image frame $f_t(n_1, n_2)$ from the previous image frame $f_{t-1}(n_1, n_2)$ as $f_t(n_1, n_2) = f_{t-1}(n_1 + d_1(n_1, n_2, t), n_2 + d_2(n_1, n_2, t))$;
   calculating a sparse signal estimate of the motion compensated current image frame $x_t$ based on the motion compensated image frame $f_t$ and a sparsity transform $(\psi)$;
   estimating a known support set of the sparse signal estimate of the motion compensated current image frame $x_t$, wherein the support set of the sparse signal estimate comprises indices of non-zero elements of the sparse signal estimate;
   calculating a sparse signal corresponding to the current image frame whose support contains a smallest number of new additions to the known support set while satisfying a data consistency constraint; and
   correcting the motion compensated current image frame image frame from the sparse signal.

2. The method of claim 1, wherein said time series of measurements of said image signal comprises a measurement vector $y_t$ and a measurement matrix $A_t$ for each time point t, said sparse signal $x_t$ is calculated for each time point t of said time series of measurements from said measurement vector $y_t$ and said measurement matrix $A_t$, and said image frame $f_t$ is calculated from the sparse signal $x_t$ for each time point in the time series.

3. The method of claim 2, wherein calculating the sparse signal $x_t$ from said measurement vector y and said measurement matrix $A_t$ comprises finding an $x_t$ that minimizes an $l_t$ norm $|x_t|$ subject to a data consistency constraint $y_t = A_t x_t$.

4. The method of claim 3, wherein calculating the sparse signal $x_t$ from said measurement vector y and said measurement matrix $A_t$ for each time point t further comprises:
   finding $x_t$ that minimizes $|x_t|$ subject to $y_t = A_t x_t$ for t=0, wherein $x_t$ is an N-dimensional vector, $y_t$ is an M-dimensional vector, and M<<N;
   initializing a support set of $x_t$ at t=0 as $\hat{S}_0 = \{i \in [1,N]: (\hat{x}_0)_i^2 > \alpha\}$, wherein $\alpha$ is a predetermined threshold, wherein the support set of $x_t$ comprises indices of non-zero elements of $x_t$;
   finding an $\hat{x}_t$ that minimizes $|x_t|$ over the complement of the support set subject to $y_t = A_t x_t$;
   updating the support set $\hat{S}_t$ of $x_t$ from $\hat{S}_t = \{i \in [1,N]: (\hat{x}_t)_i^2 > \alpha\}$; and
   repeating the steps of finding an $\hat{x}_t$ that minimizes $|x_t|$ and updating the support set $\hat{S}_t$ of $x_t$ for all t>0.

5. The method of claim 1, wherein the image frame for a given time point is related to the sparse signal for that time point by a linear transformation.

6. The method of claim 1, wherein estimating the known support set $\hat{S}_t$ of the sparse signal of the motion compensated current image frame comprises calculating $\hat{S}_t = \{i \in [1,N]: (\hat{x}_t^{MC})_i^2 > \alpha\}$, wherein t is the current time point, $\alpha$ is a predetermined threshold, $\hat{x}_t^{MC}$ is an N-dimensional vector that is the sparse signal of the motion compensated current image frame, and the support set of $\hat{x}_t^{MC}$ comprises indices of non-zero elements of $\hat{x}_t^{MC}$.

7. The method of claim 6, wherein calculating a sparse signal corresponding to the current image frame comprises finding $\hat{x}_t$ that minimizes $|x_t|$ over the complement of the support set $\hat{S}_t$ while satisfying the data consistency constraint.

8. The method of claim 7, wherein the data consistency constraint is $y_t = A_t x_t$.

9. The method of claim 7, wherein finding the sparse signal corresponding to the current time point comprises finding $\hat{x}_t$ that minimizes $|Wx_t|$ over a complement of a support set $V = \{i \in [1,N] : (x^P)_i^2 > \alpha\}$ subject to $y_t = A_t x_t$, where $x^P$ is a N-dimensional vector of predictions of the sparse signal estimate of the motion compensated image frame, and W is a weight matrix that is a function of the prediction vector $x^P$.

10. A computer implemented method of reconstructing a digital image from a set of measurements, the method performed by the computer comprising the steps of:
providing a previous image frame corresponding to a previous time point in a time series of measurements of an image signal, and a current image frame corresponding to a current time point in said time series, wherein said time series of measurements of said image signal comprises a measurement vector y and a measurement matrix A for each time point t;
calculating an estimated motion vector between the previous image frame and the current image frame;
using the estimated motion vector to calculate from the previous image frame a motion compensated current image frame;
finding a sparse signal $\hat{x}_t$ corresponding to the current time point that minimizes an $l_1$ norm $|Wx_t|$ over a complement of a support set $V = \{i \in [1,N] : (x^P)_i^2 > \alpha\}$
subject to a data consistency constraint, wherein, .alpha. is a predetermined threshold, $x^P$ is a N-dimensional vector of predictions of the sparse signal estimate of the motion compensated image frame, W is a weight matrix that is a function of the prediction vector $x^P$, wherein diagonal elements of the weight matrix W is defined as one of:

a) $w(i, i) = \dfrac{1}{|(X^P)_i|}$ b) $w(i, i) = \begin{cases} 1 & i \in V^C, \\ 0 & \text{otherwise,} \end{cases}$ c) $w(i, i) = \begin{cases} \dfrac{1}{|(x^P)_i|} & i \in V^C, \\ 0 & \text{otherwise,} \end{cases}$ or d) $w(i, i) = \begin{cases} 1 & i \in V^C, \\ \dfrac{1}{|(x^P)_i|} & \text{otherwise,} \end{cases}$ wherein said sparse signal x is calculated for each time point t of said time series of measurements from said measurement vector y and said measurement matrix A, and said image frame f is calculated from the sparse signal x for each time point in the time series; and
correcting the motion compensated current image frame image frame from the sparse signal.

11. The method of claim 10, wherein the image frame for a given time point is related to the sparse signal for that time point by a linear transformation.

12. The method of claim 10, wherein the data consistency constraint is y=Ax.

13. The method of claim 10, wherein the data consistency constraint is $\|y-Ax\|_2 < \epsilon$, wherein $\epsilon$ is a measure of measurement noise.

14. A non-transitory program storage device readable by a computer, tangibly embodying a program of instructions executable by the computer to perform the method steps for reconstructing a digital image from a set of measurements, the method performed by the computer comprising the steps of:
providing a previous image frame corresponding to a previous time point in a time series of measurements of an image signal, and a current image frame corresponding to a current time point in said time series;
calculating an estimated motion vector $d_{t-1}$ for spatial point $(n_1, n_2)$ and current time point t between the previous image frame corresponding to the previous time point and the current image frame corresponding to the current time point;
updating a motion compensated current image frame $f_t(n_1, n_2)$ from the previous image frame $f_{t-1}(n_1, n_2)$ as $f_t(n_1, n_2) = f_{t-1}(n_1 + d_1(n_1, n_2, t), n_2 + d_2(n_1, n_2, t))$;
calculating a sparse signal estimate of the motion compensated current image frame $x_t$ based on the motion compensated image frame $f_t$ and a sparsity transform ($\psi$);
estimating a known support set of the sparse signal estimate of the motion compensated current image frame $x_t$, wherein the support set of the sparse signal estimate comprises indices of non-zero elements of the sparse signal estimate;
calculating a sparse signal corresponding to the current image frame whose support contains a smallest number of new additions to the known support set while satisfying a data consistency constraint; and
correcting the motion compensated current image frame image frame from the sparse signal.

15. The computer readable program storage device of claim 14, wherein said time series of measurements of said image signal comprises a measurement vector $y_t$ and a measurement matrix $A_t$ for each time point t, said sparse signal $x_t$ is calculated for each time point t of said time series of measurements from said measurement vector $y_t$ and said measurement matrix $A_t$, and said image frame $f_t$ is calculated from the sparse signal $x_t$ for each time point in the time series.

16. The computer readable program storage device of claim 15, wherein calculating the sparse signal $x_t$ from said measurement vector y and said measurement matrix $A_t$ comprises finding an $x_t$ that minimizes an $l_1$ norm $|x_t|$ subject to a data consistency constraint $y_t = A_t x_t$.

17. The computer readable program storage device of claim 16, wherein calculating the sparse signal $x_t$ from said measurement vector y and said measurement matrix $A_t$ for each time point t further comprises:
finding $x_t$ that minimizes $|x_t|$ subject to $y_t = A_t x_t$ for t=0, wherein $x_t$ is an N-dimensional vector, $y_t$ is an M-dimensional vector, and M<<N;
initializing a support set of $x_t$ at t=0 as $\hat{S}_0 = \{i \in [1,N] : (\hat{x}_0)_i^2 > \alpha\}$, wherein $\alpha$ is a predetermined threshold, wherein the support set of $x_t$ comprises indices of non-zero elements of $x_t$;
finding an $\hat{x}_t$ that minimizes $|x_t|$ over the complement of the support set subject to $y_t = A_t x_t$;
updating the support set $\hat{S}_t$ of $x_t$ from $\hat{S}_t = \{i \in [1,N] : (\hat{x}_t)_i^2 > \alpha\}$; and
repeating the steps of finding an $\hat{x}_t$ that minimizes $|x_t|$ and updating the support set $\hat{S}_t$ of $x_t$ for all t>0.

18. The computer readable program storage device of claim 14, wherein the image frame for a given time point is related to the sparse signal for that time point by a linear transformation.

19. The computer readable program storage device of claim 14, wherein estimating the known support set $\hat{S}_t$ of the sparse signal of the motion compensated current image frame comprises calculating $\hat{S}_t=\{i\in[1,N]:(\hat{x}_t^{MC})_i^2>\alpha\}$, wherein t is the current time point, $\alpha$ is a predetermined threshold, $\hat{x}_t^{MC}$ is an N-dimensional vector that is the sparse signal of the motion compensated current image frame, and the support set of $\hat{x}_t^{MC}$ comprises indices of non-zero elements of $\hat{x}_t^{MC}$.

20. The computer readable program storage device of claim 19, wherein calculating a sparse signal corresponding to the current image frame comprises finding $\hat{x}_t$ that minimizes $|x_t|$ over the complement of the support set $\hat{S}_t$ while satisfying the data consistency constraint.

21. The computer readable program storage device of claim 20, wherein the data consistency constraint is $y_t = A_t x_t$.

22. The computer readable program storage device of claim 20, wherein finding the sparse signal corresponding to the current time point comprises finding $\hat{x}_t$ that minimizes $|Wx_t|$ over a complement of a support set $V=\{i\in[1,N]: (x^P)_i^2>\alpha\}$ subject to $y_t=A_t x_t$, wherein $x^P$ is a N-dimensional vector of predictions of the sparse signal estimate of the motion compensated image frame, and W is a weight matrix that is a function of the prediction vector $x^P$.

* * * * *